US006813698B2

(12) United States Patent
Gallo et al.

(10) Patent No.: US 6,813,698 B2
(45) Date of Patent: Nov. 2, 2004

(54) CONCURRENT CONFIGURATION OF DRIVES OF A DATA STORAGE LIBRARY

(75) Inventors: Frank David Gallo, Rogers, AR (US); Brian Gerard Goodman, Tucson, AZ (US); Ronald Faye Hill, Jr., Tucson, AZ (US); Roberta Lee Winston, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 09/970,933

(22) Filed: Oct. 5, 2001

(65) Prior Publication Data

US 2003/0070053 A1 Apr. 10, 2003

(51) Int. Cl.[7] .............................................. G06F 12/00
(52) U.S. Cl. ........................ 711/170; 713/100; 713/1; 710/7; 710/10
(58) Field of Search ................................ 711/170, 4, 5, 711/111, 112, 114; 710/20, 10, 7; 713/100, 1; 714/2, 3, 7

(56) References Cited

U.S. PATENT DOCUMENTS

| | | | |
|---|---|---|---|
| 5,623,471 A | 4/1997 | Prigge | 369/84 |
| 5,731,926 A | 3/1998 | Gallo et al. | 360/92 |
| 5,761,161 A | 6/1998 | Gallo et al. | 369/36 |
| 5,970,030 A | 10/1999 | Dimitri et al. | 369/36 |
| 6,052,341 A | 4/2000 | Bingham et al. | 369/34 |
| 6,061,321 A | 5/2000 | Kanetsuku et al. | 369/91 |
| 6,081,849 A | 6/2000 | Born et al. | 710/7 |
| 2002/0049923 A1 * | 4/2002 | Kanazawa et al. | 714/5 |
| 2003/0033577 A1 * | 2/2003 | Anderson | 716/1 |
| 2003/0050729 A1 * | 3/2003 | Basham et al. | 700/214 |

* cited by examiner

Primary Examiner—Kimberly N. McLean-Mayo
(74) Attorney, Agent, or Firm—John H. Holcombe

(57) ABSTRACT

Drives of a data storage library are concurrently configured. A processor transmits library configuration data separately to each drive, initializes a first configuration process state, with a time-out period, for each drive. A drive responds with a status response, the first process state is updated to "completed". A request for drive unique information is transmitted to the responding drive, advancing the process to a second state, with a time-out period. A drive responds with the information, and the second process state is updated to "completed", and the received information is stored.

20 Claims, 6 Drawing Sheets

CONCURRENT CONFIGURATION OF DRIVES OF A DATA STORAGE LIBRARY

FIELD OF THE INVENTION

This invention relates to data storage libraries having a plurality of data storage drives, and, more particularly, to data storage libraries in which the data storage drives may be interchanged, added, or removed.

BACKGROUND OF THE INVENTION

Data processing systems typically require large amounts of data storage capacity, some of which is needed quickly and may be stored in memory and hard disk drives, and other of which is not immediately required. As an example, data not immediately required may comprise data that is infrequently accessed, and the storage of the data may be in removable data storage media, such as magnetic tape cartridges or optical disk cartridges, stored in data storage libraries for the use of host data processing systems. Such data storage libraries provide efficient access to large quantities of the data storage media, which are stored in storage shelves and which are accessed by one or more accessors and delivered to data storage drives in the library. In one example, a magnetic tape cartridge data storage library stores over 6,000 cartridges and has over 50 data storage drives.

Each time that a number of data storage drives are replaced or added, e.g., by replacing or adding a frame, the affected drives may need to be configured. Additionally, drives may be swapped with one another or with new drives, or several drives may be provided with code updates and reset, or there may be a power reset of the library, requiring configuration of the affected drives. In this context, a drive may comprise a tape drive for reading and/or writing a magnetic tape cartridge, an optical drive for reading and/or writing an optical disk cartridge, a disk drive for reading and/or writing a removable disk cartridge, or a data transfer station for transferring data with respect to a cartridge having a removable data storage device. The configuration of a drive in a library typically has two parts. In one part, library configuration data is supplied to the drive, such as a communication identifier (SCSI, Fibre Channel, etc.) for the drive to allow the drive to communicate with the library and with any attached host. In another part, the drive provides drive unique information to the library, such as its drive identifier (part number, serial number).

Drive allocation is known, e.g., in U.S. Pat. No. 6,052,341, which relates to a device element allocation manager for a multi-library system. The system shows, inter alia, a switching matrix coupled to a plurality of hosts for selectively allocating and connecting a plurality of known drives to the hosts for reading and writing data of cartridges, and providing dynamic tracking of all the physical cartridge locations. A cartridge requested by a host is moved to a free drive, and the drive is allocated to the host and coupled by the switching matrix. As another example, U.S. Pat. No. 5,623,471, shows backup copying from one cartridge to another employing a multi-threaded operation in which if two known drives are available, they are allocated to the process and interconnected. The interchange, addition, or removal of one or more of the drives is not discussed and is assumed to require, as in prior art libraries, a reconfiguration of the library or libraries, specifically by a library processor.

The typical configuration or reconfiguration is conducted serially. For example, each of the data storage drives is coupled to a library processor, and the processor and a first drive communicate until the configuration of that drive is complete, at which time the configuration process steps to the next drive. With a large number of data storage drives, the configuration process is very time consuming.

The data stored in data storage libraries is not frequently accessed, but when needed, is needed promptly. Also, data to be stored in a library builds up quickly and must be stored without undue delay. Thus, if the library is subject to a reconfiguration or a power-on reset, it must come up to full capability as soon as possible so that the library is available to provide data access and storage.

SUMMARY OF THE INVENTION

An object of the present invention is to allow configuration of data storage drives of a data storage library without undue delay.

Disclosed are a data storage library and a computer implemented method for concurrently configuring data storage drives of the library. The library comprises at least one processor for configuring the data storage drives.

The processor determines the presence of each of the data storage drives to be configured; and transmits library configuration data separately to each of the data storage drives to be configured. Each of the data storage drives is arranged to acknowledge receipt of the configuration data with a status response.

Upon the transmission of the library configuration data to a data storage drive, a configuration process state for the data storage drive is initialized to a first process state, for example, in a task monitor. A first time-out period is started for receipt of the status response from the data storage drive.

In response to receipt of the status response from a data storage drive to be configured within the first time-out period, in one embodiment, the configuration first process state for the status responding data storage drive is updated, for example, to "completed".

The processor transmits a request for drive unique information to the status responding data storage drive, and, the configuration process state is advanced to a second process state for the status responding data storage drive. A second time-out period is started for receipt of the drive unique information for the status responding data storage drive.

In response to receipt of the drive unique information from a status responding data storage drive within the second time-out period, in the one embodiment, the configuration second process state for the information responding data storage drive is updated, for example, to "completed".

The processor then stores the drive unique information received from the information responding data storage drive.

In another embodiment, an error is signalled upon expiration of the first time-out period without receipt of the status response for a data storage drive to be configured, or expiration of the second time-out period without receipt of the drive unique information for a status responding data storage drive.

In one example, the library configuration data comprises at least a communication identifier for the data storage drive, e.g., for communication between the drive and a host. In another example, e.g., when a host communicates with the library through a drive, the configuration data may additionally comprise an element address assignment for the data storage drive, and serial number for the data storage library.

The drive unique information, in one example, comprises at least a part number of the data storage drive and the serial number for the data storage drive.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
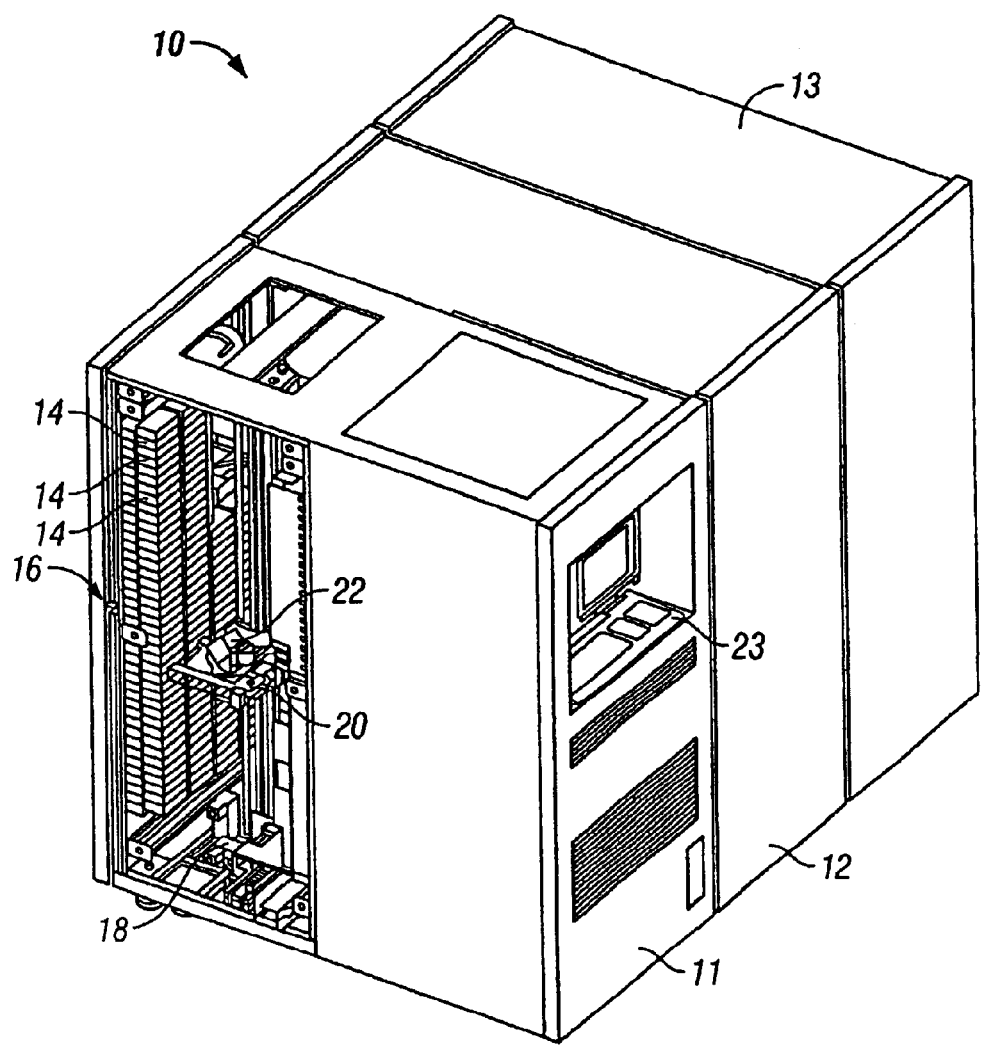
FIG. 1 is an isometric view of a data storage library implementing an embodiment of the present invention.
Figure 2:
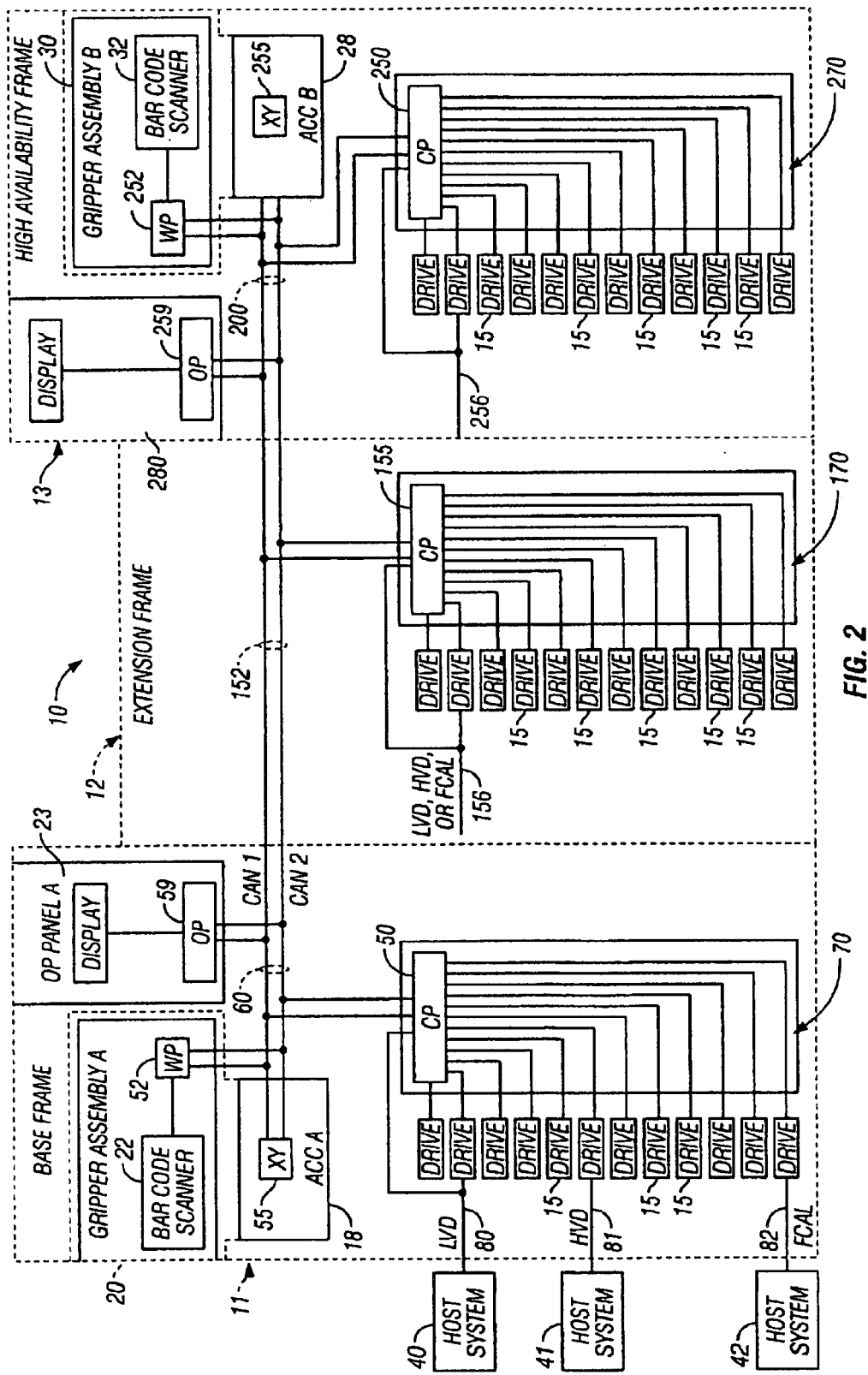
FIG. 2 is a block diagram of the data storage library of FIG. 1.

FIGS. 1 and 2 illustrate a data storage library 10 which stores and retrieves data storage media 14 in storage shelves 16. An example of a data storage library which may implement the present invention is the IBM 3584 Tape Library. The library comprises a base frame 11, may additionally comprise one or more extension frames 12, and may comprise a high availability frame 13.

The base frame 11 of the library 10 comprises one or more data storage drives 15, and an accessor 18. The accessor 18 includes a gripper assembly 20 and may include a bar code scanner 22 or reading system, such as a smart card reader or similar system, mounted on the gripper 20, to "read" identifying information about the data storage media 14. The data storage drives 15, for example, may be optical disk drives or magnetic tape drives, and the data storage media 14 may comprise optical or magnetic tape media, respectively, or any other removable media and associated drives. As examples, a data storage drive may comprise an IBM LTO Ultrium Drive, may comprise a DLT 8000 Drive, etc. Additionally, a control port may be provided, which acts to communicate between a host and the library, e.g., receiving commands from a host and forwarding the commands to the library, but which is not a data storage drive. A control port is, however, configured in the same manner as a data storage drive, and provides unique information similar to that of a drive. Hence, herein, the terms "data storage drive", "drive", and "drive unique information" refer to true drives, to data transfer stations as discussed above, and/or to control ports and similar devices. The library may also comprise an operator panel 23 or other user interface, such as a web-based interface, which allows a user to interact with the library.

The extension frame 12 comprises additional storage shelves, and may comprise additional data storage drives 15. The high availability frame 13 may also comprise additional storage shelves and data storage drives 15, and comprises a second accessor 28, which includes a gripper assembly 30 and may include a bar code scanner 32 or other reading device, and an operator panel 280 or other user interface. In the event of a failure or other unavailability of the accessor 18, or its gripper 20, etc., the second accessor 28 may take over.

Each of the accessors 18, 28 moves its gripper in at least two directions, called the horizontal "X" direction and vertical "Y" direction, to retrieve and grip, or to deliver and release the data storage media 14 at the storage shelves 16 and to load and unload the data storage media at the data storage drives 15.

Referring to FIG. 2, the library 10 receives commands from one or more host systems 40, 41 or 42. The host systems, such as host servers, communicate with the library, either directly, e.g., on path 80, or through one or more data storage drives 15, providing commands to access particular data storage media and move the media, for example, between the storage shelves and the data storage drives. The commands are typically logical commands identifying the media and/or logical locations for accessing the media.

The library is controlled by one or more processors, the processors receiving the logical commands and converting the commands to physical movements of the accessor 18, 28.

The processors may comprise a centralized control system, or a distributed control system. In one example of a distributed control system, a communication processor node 50 may be located in the base frame 11. The communication processor node provides a communication link for receiving the host commands, either directly or from the drives 15. The communication processor node 50 may additionally provide a communication link for operating the data storage drives 15. As will be discussed, the data storage drives 15 are individually coupled to the communication processor node 50.

The communication processor node 50 may be located in the frame 11, close to the data storage drives 15. Additionally, in an example of a distributed processor system, one or more additional work processor nodes are provided, which may comprise, e.g., a work processor node 52 that may be located at the accessor 18, and that is coupled to the communication processor node 50. Each work processor node may respond to received commands that are broadcast to the work processor nodes from any communication processor node, and the work processor node may also direct the operation of the accessor, providing move commands. An XY processor node 55 may be provided and may be located at an XY system of the accessor 18. The XY processor node 55 is coupled to the work processor node 52, and is responsive to the move commands, operating the XY system to position the gripper 20.

Also, an operator panel processor node 59 may be provided at the operator panel 23 for providing an interface for communicating between the operator panel and the communication processor node 50, the work processor node 52, and the XY processor node 55.

A common bus 60 may be provided, coupling the various processor nodes. The common bus may comprise a redundant wiring network, such as the commercially available "CAN" bus system, which is a multi-drop network, having a standard access protocol and wiring standards, for example, as defined by CiA, the CAN in Automation Association, Am Weich selgarten 26, D-91058 Erlangen, Germany. Other similar bus networks, or a wireless network system, such as RF or infrared, may be employed in the library as is known to those of skill in the art.

Referring to FIG. 2, the communication processor node 50 is coupled to each of the data storage drives 15 of the base frame 11, communicating with the drives and with host systems 40, 41 and 42. Alternatively, the host systems may be directly coupled to the communication processor node 50. As is known to those of skill in the art, various communication arrangements may be employed for communication with the hosts and with the data storage drives. In the example of FIG. 2, host connections 80 and 81 are SCSI busses. Bus 82 comprises an example of a Fibre Channel-Arbitrated Loop which is a high speed serial data interface, allowing transmission over greater distances than the SCSI bus systems.

The data storage drives 15 may be in close proximity to the communication processor node 50, and may employ a short distance communication scheme, such as SCSI, or a serial connection, such as RS-422. The data storage drives 15 are thus individually coupled to the communication processor node 50 by means of lines 70, which, additionally, each comprise a "presence" sense line, such as a ground connection, to indicate whether a drive is present. Alternatively, "presence" may be detected through some other means, such as handshake communication, involving a minimal response.

An extension frame 12 may be provided, and may be coupled by an extension common bus 152 to the base frame common bus 60. Another communication processor node 155 may be located in the extension frame and may communicate with both hosts and data storage drives 15 in frame 12, e.g., at input 156. Thus, commands from hosts may be received either directly or via the data storage drives. The communication processor node 155 is coupled to the extension common bus 152, the communication processor node providing a communication link for the commands to the extension common bus 152, so that the commands are linked to the base frame common bus 60 and to the work processor node 52. The extension common bus 152 may comprise a flex cable connection and a multi-drop bus network coupled to the base frame common bus 60 in the base frame.

The communication processor node 155 may be mounted in the extension frame 12, closely adjacent to the coupled data storage drives 15 of the extension frame 12, communicating with the drives and with the attached host systems. The data storage drives 15 are also individually coupled to the communication processor node 155 by means of lines 170, such as RS-422, which, additionally, each comprise a "presence" sense line, such as a ground connection, to indicate whether a drive is present.

Additional extension frames with identical communication processor nodes 155, storage shelves 16, data storage drives 15, and extension busses 152, may be provided and each is coupled to the adjacent extension frame.

Further, the data storage library 10 may additionally comprise another accessor 28, for example, in a high availability frame 13. The accessor 28 may comprise a gripper 30 for accessing the data storage media, and an XY system 255 for moving the accessor. The high availability frame may be adjacent an extension frame 12, or adjacent the base frame 11, and the accessor 28 may run on the same horizontal mechanical path as accessor 18, or on an adjacent path. The exemplary control system additionally comprises an extension common bus 200 coupled to the extension common bus 152 of an extension frame or to the common bus 60 of the base frame. Another communication processor node 250 may be provided, and may be located in the high availability frame 13, for receiving commands from hosts, either directly or through the data storage drives 15, e.g., at input 256. The communication processor node 250 is coupled to the high availability frame extension common bus 200 and provides a communication link for the commands to the extension common bus.

The communication processor node 250 may be mounted closely adjacent to the coupled data storage drives 15 of the high availability frame 13, communicating with the drives and with the attached host systems. The data storage drives 15 are also individually coupled to the communication processor node 250 by means of lines 270, such as RS-422, which, additionally, each may comprise a "presence" sense line, such as a ground connection, to indicate whether a drive is present.

As discussed above, any time a number of drives are replaced, added or reset, there is a library-wide power-on reset, or a library configuration, the drives typically require configuration data. This data may include a communication identifier, such as a SCSI identifier or a Fibre Channel identifier. The data may also include a library world wide node name (WWNN), library part number, library serial number, an element address (EA) of the drive (the EA is a SCSI identifier related to the location of the element, such as a drive or storage slot, in the library, as is known in the art), etc. In a case where the library is partitioned into multiple logical libraries, and the drive is a representative of the library, where certain commands intended for the library are handled by the drive, additional configuration data may be required. The above is discussed in coassigned U.S. patent application Ser. No. 09/853,557. Examples of additional configuration data comprises EA ranges for the logical library to which the target drive belongs, and library inquiry data, such as the library part number, library serial number, and the library code version level.

Further, the drive may provide drive unique data to the library, such as its drive identifier, e.g., the drive part number and serial number.

As also discussed above, data stored in data storage libraries, when needed, is needed promptly, and data to be stored in a library builds up quickly and must be stored without undue delay. If the library is subject to a reconfiguration or a power-on reset, it must come up to full capability as soon as possible so that the library is available to provide data access and storage.

The present invention provides concurrent, rather than serial, configuration of data storage drives of a data storage library, so as to provide configuration or reconfiguration without undue delay. Herein, configuration and reconfiguration are both termed configuration.

Referring to FIG. 2, a computer program implementing the present invention may be provided at work processor 52, or, optionally at processor 50, and operates over lines 70 itself, and through processor 155 and over lines 170, and through processor 250 and over lines 270, or may be implemented separately in processor 50 over lines 70, in processor 155 and over lines 170, and in processor 250 and over lines 270, or in processors 52 and 252.

A configuration process may be conducted for all of the data storage drives of a library, or may be conducted for a subset of the data storage drives. Hence, the process is characterized herein as for the data storage drives to be configured.

At least one computer processor of the data storage library is operated in accordance with one or more computer program products running on the processor. The computer program product(s) may be supplied at an I/O station, such as the operator panels 23, 280, from a storage medium which stores executable computer instructions. One example of a storage medium is a CD ROM optical disk. Other suitable storage media are magnetic diskettes, magnetic tape cartridges, optical disk cartridges, removable hard disk cartridges, read only memories (ROM), programmable read only memories (PROM), flash PROM, etc. The requirement for the storage media or memories is that they store digital representations of computer executable instructions. The computer program product may alternatively be supplied electronically, as from the hosts 40, 41, 42. The computer program products may be temporarily stored in memory.

Figure 3C:
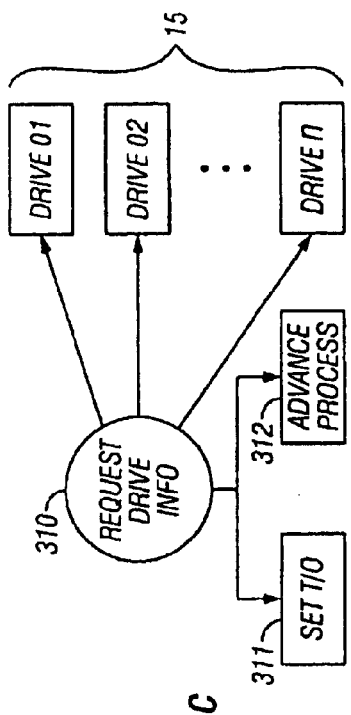
FIGS. 3A–3E are diagrammatic representations of steps of an embodiment of the present invention.
Figure 3D:
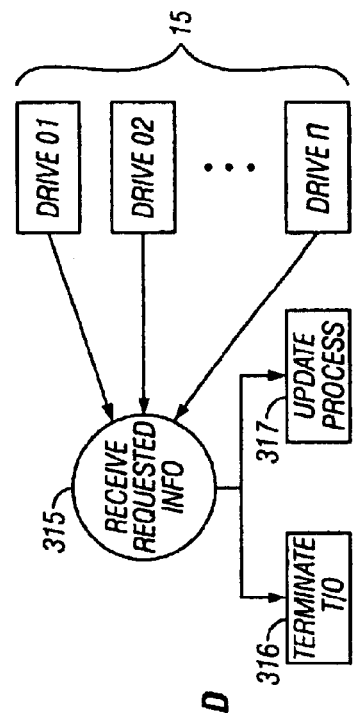
Figure 3E:
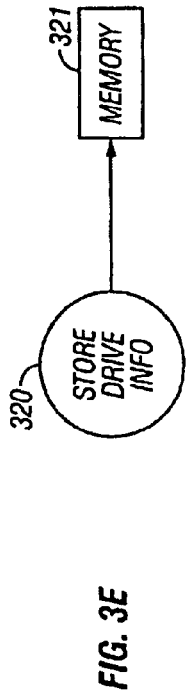
Figure 3A:
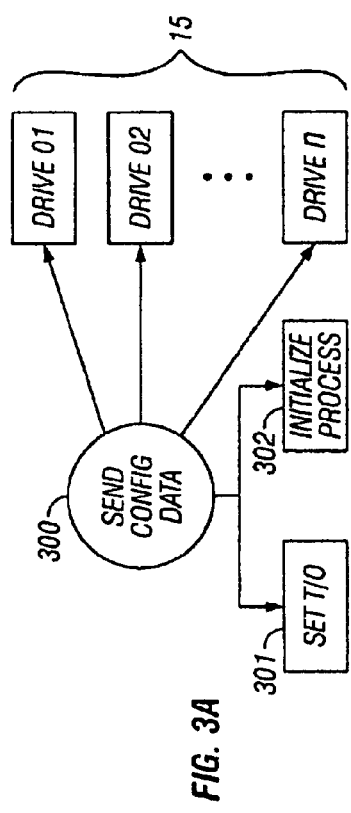

Referring to FIG. 3A, the processor, at step 300, determines the presence of each of the data storage drives 15 to be configured, e.g., by means of the sense line of the associated individual lines 70, 170, 270 of FIG. 2; and transmits library configuration data separately to each of the data storage drives 15 to be configured. As an example, the library configuration data may be transmitted in sequence to each of the data storage drives. Alternatively, configuration data may be sent without checking for drive presence. Default data or no data may be sent to drive positions that had not been previously set up or recognized by the library.

The data storage drives are arranged to respond to a known "handshake", which comprises part of the transmission of the library configuration data. As discussed above, library configuration data comprises information required by the drive to relate to the library and to the hosts, as is known to those of skill in the art, and may be different for various data storage drives which comprise various logical libraries in a large physical library. As examples, the data may comprise 1) element address ranges for the drives and the I/O partitions of the logical library in which the target drive belongs, 2) the target drive's own element address assignment, 3) the target drive's assigned communication identifier (such as a SCSI ID, Fibre Channel ID or other communication identifier), and 4) the library inquiry data, such as the part number and serial number of the library. The minimum configuration data that is supplied to a drive is the drive's communication identifier to allow identification of the drive by the attached hosts.

Each of the data storage drives is arranged to acknowledge receipt of the configuration data with a status response. In step 301, a first time-out period is separately started for receipt of the status response from the data storage drive, and the configuration process is initialized in step 302, separately for each data storage drive. The configuration process and time-out periods comprise means for separately tracking the response of each of the drives.

The process comprises starting the process for one drive, waiting, and, while waiting, starting the process for the next drive, etc.

Thus, the configuration process is begun for each of the data storage drives to be configured, and the configuration is separately conducted for each of the data storage drives, and is conducted concurrently for all of the data storage drives to be configured.

Figure 3B:
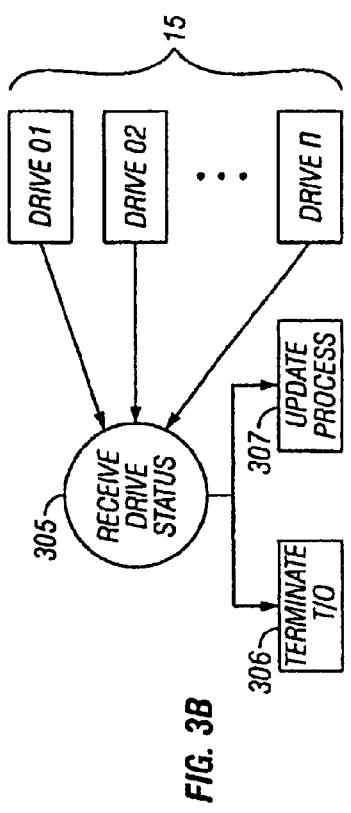

Referring to FIG. 3B, a data storage drive which has received and validated the library configuration data, responds with a status message. Status messages are known to those of skill in the art, and indicate the current status of the drive. Examples for a drive of a tape library include whether it has a cartridge loaded, it needs to be cleaned, is ready to service commands, etc. The status message is sent by the drive when the drive status is updated. When the drive receives the configuration data from the library, it typically undergoes a reset. When it finishes initializing, the drive status message is sent out asynchronously as a signal that the drive has transitioned to a state which allows it to service commands. Thus, indirectly, the drive status message tells the library that the configuration data was accepted (stored to the drive's memory) and the drive is now ready for other commands. Alternatively, the drive status response message may not be the result of a reset. As a further alternative, the drive may directly respond that the configuration data was received, and is termed herein as a status response even though no status message may be involved.

Step 305 represents the receipt of the status response from a data storage drive 15. In response to receipt of the status response from a data storage drive to be configured within the first time-out period, the first time-out period is terminated in step 306, and, in step 307, the configuration first process state for the status responding data storage drive is updated, for example, to "completed".

In one embodiment, an error is signaled upon expiration of the first time-out period of step 301 without receipt of the status response for a data storage drive to be configured, which may result in posting an error and/or a recovery action. As examples, a drive may fail to accept the configuration data due, e.g., the drive being powered off, or the drive may be dead, or the drive may be physically disconnected from the library. Drive communication failure is the most likely circumstance. As further examples, a drive may fail to respond in a timely manner due, e.g., having its processor hung, or having communication problems.

Referring to FIG. 3C, if step 307 of FIG. 3B indicates that the process was completed for the status responding data storage drive, the processor, in step 310, transmits a request for drive unique information to the status responding data storage drive. In step 312, the configuration process state is advanced to a second process state for the status responding data storage drive. In step 311, a second time-out period is started for receipt of the drive unique information for the status responding data storage drive. Thus, the requests for drive unique information are conducted asynchronously, based on the receipt of the status response for that drive, while waiting for other status responses and while waiting for drive unique information of other drives.

Drive unique information comprises, inter alia, a drive identifier of the drive. As an example, the drive identifier comprises the part number of the data storage drive and the serial number for the data storage drive. Additional information may comprise its world wide node name (WWNN), firmware version, EC level, etc. Thus, the library determines the specifics of the data storage drive during the configuration process.

Referring to FIG. 3D, a data storage drive which has received and validated the request for drive unique information, responds with the requested information. Step 315 represents the receipt of the drive unique information from a data storage drive 15.

In response to receipt of the drive unique information from a status responding data storage drive within the second time-out period, the second time-out period is terminated in step 316, and in one embodiment of step 317, the configuration second process state for the information responding data storage drive is updated, for example, to "completed".

Again, upon expiration of the second time-out period of step 311 without receipt of the drive unique information for a status responding data storage drive, an error is signaled. This may result in posting an error and/or a recovery action.

Referring to FIG. 3E, the processor, upon receiving the drive unique information of step 315 of FIG. 3D, then, in step 320, stores the received drive unique information received from the information responding data storage drive, for example, in memory 321, such as a non-volatile random access memory (NVRAM).

Thus, the configuration process is conducted for each of the data storage drives to be configured, and the configuration is separately conducted for each of the data storage drives, and is conducted concurrently for all of the data storage drives to be configured, such that the library processor(s) distribute the library configuration data to each of the drives to be configured and receive the drive unique information for each of the drives, all without undue delay.

Figure 4:
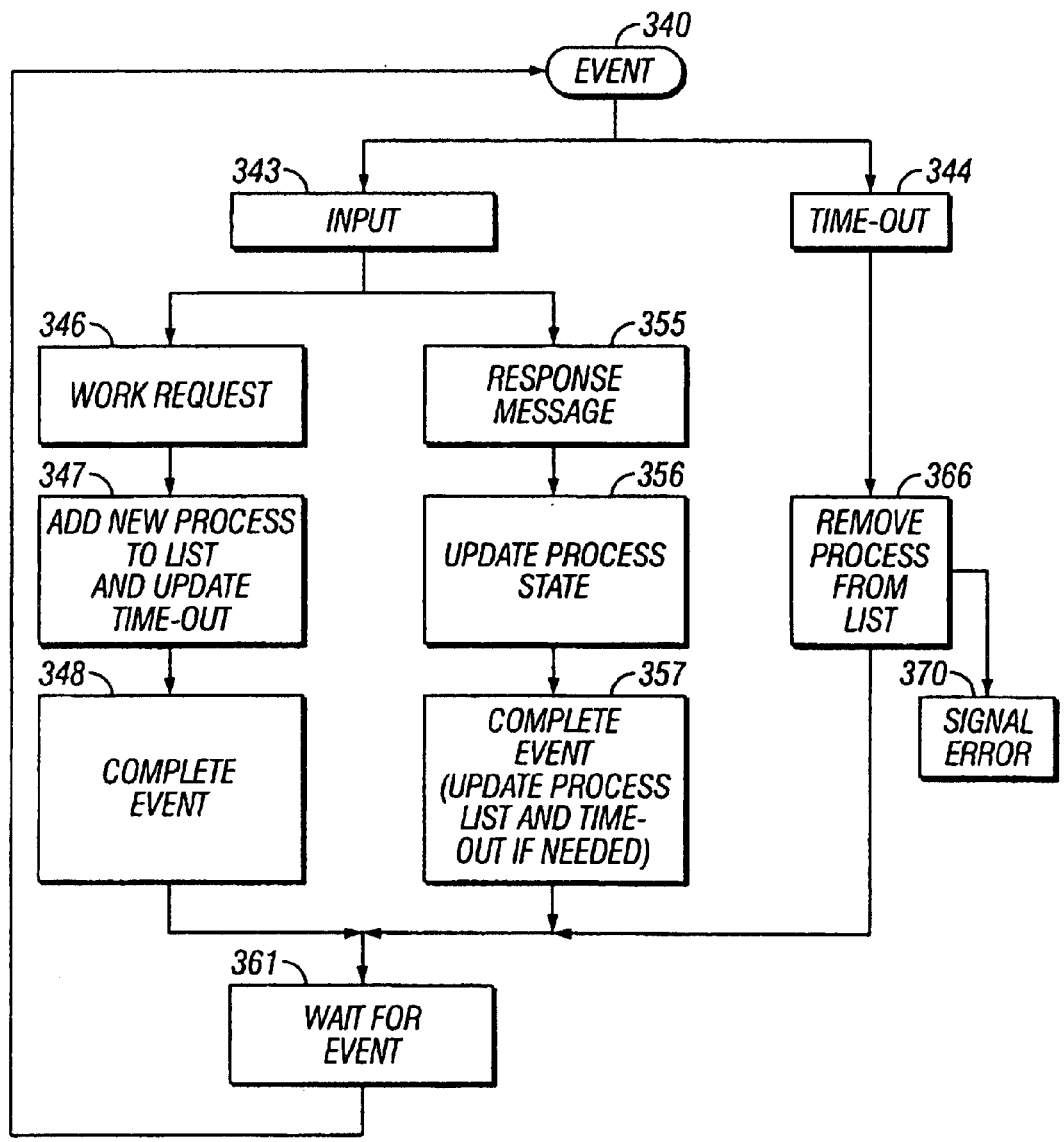
FIG. 4 is a flow chart depicting a task monitor which is employed to implement an alternative embodiment of the present invention.

An alternative embodiment of the configuration process is represented in FIGS. 4–8, employing a task monitor. The task monitor comprises a code object, and is represented in FIG. 4.

The task monitor senses the occurrence of events for which it has been enabled, beginning at step 340. Other events than those depicted, such as the receipt of a data request, may be within the context of events for which the task monitor is enabled. One embodiment of a task monitor comprises a state machine, which is known to those of skill in the art.

Upon the occurrence of an event in step 340, the task monitor determines the type of event, for example, sensing an input of a process at step 343, or of a time-out of a current process at step 344.

In step 346, the input of a process comprises a work request, in the instant case, that of the initiation of a configuration process for a data storage drive to be configured. In step 347, that process is added to a list of processes and any required time-out period is established, and, in step 348, the event is completed, which may comprise indicating that the process has begun, advancing the process.

In step 355, the input of a process comprises a response message relating to a process of the task monitor. In step 356, that process is updated, for example, as "completed", and, in step 357, the event is completed, which may comprise advancing to the next step of the process, and any required time-out period is established for the next step of the process of step 357. In step 361, the task monitor waits for the next occurrence of an event.

Should an event comprise the expiration of a time-out period for an event of a process without the occurrence of the expected event, in step 344, that process is removed from the process list in step 366. In step 370, in response to the expiration of the time-out period, an error is posted and an error recovery process may be started.

Figure 5:
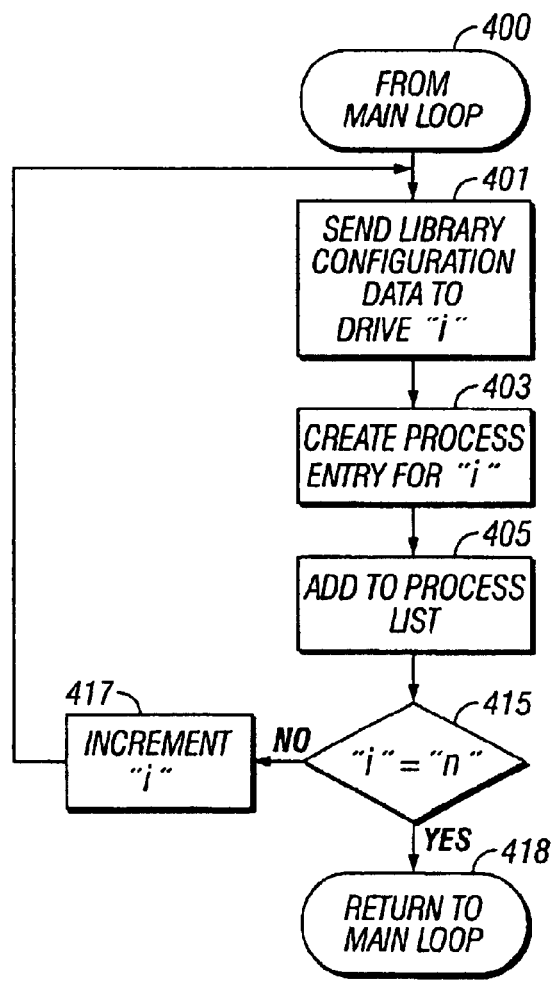
FIG. 5 is a flow chart depicting an embodiment of a portion of the present invention employing the task monitor of FIG. 4.

FIG. 5 depicts the initiation of the configuration process for the data storage drives to be configured, in the context of the task monitor of FIG. 4, in which the event comprises the addition of a new process to the list of step 347.

The processor first determines the presence of each of the data storage drives 15 to be configured, e.g., by means of the sense line of the associated individual lines 70, 170, 270 of FIG. 2 or alternatively by other means, such as a handshake communication. Then, the processor begins the configuration process from the main loop of the task monitor at step 400, separately for each of the data storage drives to be configured. As depicted, each data storage drive to be configured is given an index number "i". In step 401, the processor transmits library configuration data separately to the current drive "i" to be configured, and, in step 403, the processor creates the process entry for the task monitor for the current data storage drive "i". In step 405, the process entry is added to the process list for the configuration process, comprising the process list of step 347 of FIG. 4.

As an alternative to determining the "presence" of each data storage drive, the processor may transmit library configuration data to all drive locations in step 401, and wait for a time-out to expire. If there is no response within the time-out period, the recovery action may be to send the library configuration again, and if it times-out again, the processor assumes no drive is at that drive location.

Figure 6:
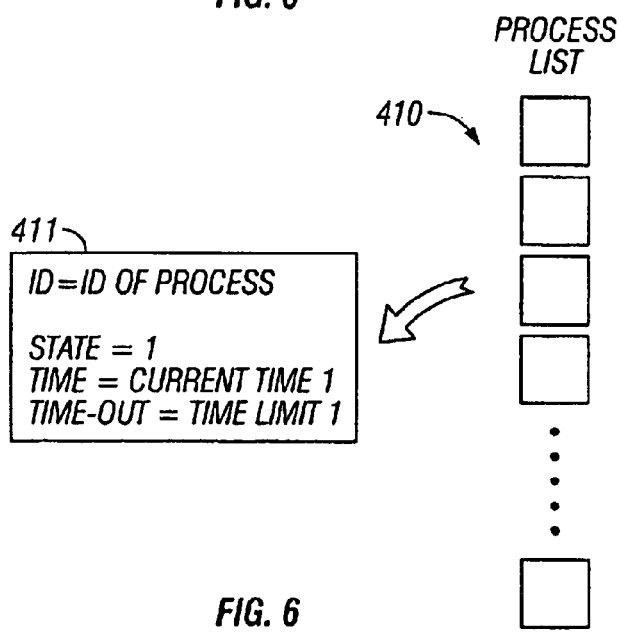
FIG. 6 is a diagrammatic representation of a process list for the flow chart of FIG. 5.

An example of a configuration process list 410, and an entry 411 of the process list are depicted in FIG. 6. As an example, the entry 411 comprises 1) an identifier of the process (e.g., identifying the configuration process); 2) the state of the process (e.g., state 1 of the configuration process); 3) the current time (for establishing the time for the start of the time-out period); and 4) the time-out period (e.g., for the first time-out period). The content of the library configuration data is as discussed above.

Still referring to FIG. 5, in step 415, the processor determines whether library configuration data has been transmitted to all of the data storage drives to be configured, "n" drives, by, for example, determining whether the index number of drive "i" is equal to "n". If not, "i" is incremented to "i" plus one in step 417, and steps 401–405 are repeated for the next drive. If the library configuration data has been transmitted to all of the data storage drives to be configured, "YES" in step 415, the process returns to the main loop in step 418, completing the event of step 348 of FIG. 4, and the time-out list is updated with the time-out information for each data storage drive "i" of the process list of FIG. 6.

Figure 7:
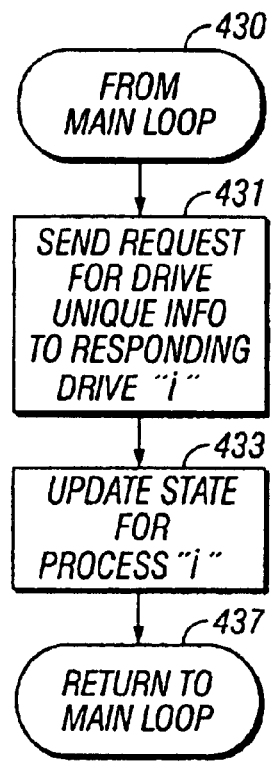
FIG. 7 is a flow chart depicting an embodiment of a portion of the present invention employing the task monitor of FIG. 4.
Figure 8:
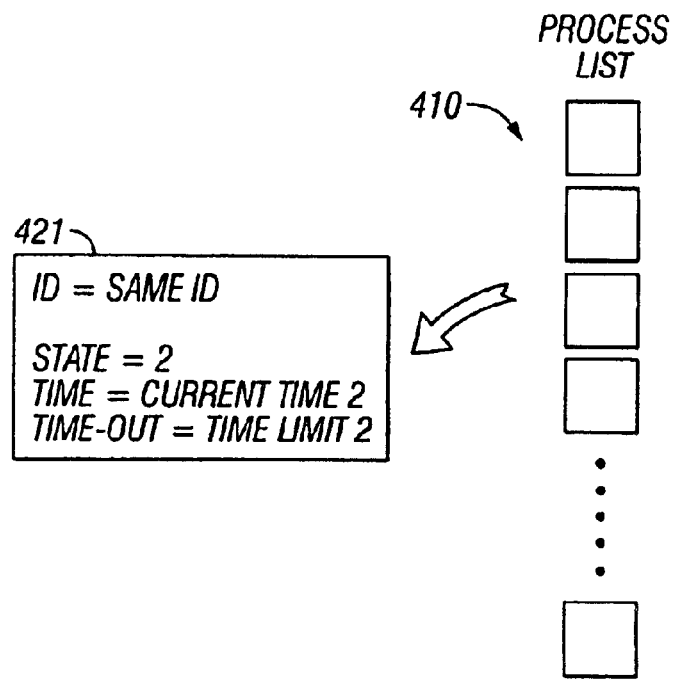
FIG. 8 is a diagrammatic representation of a process list for the flow chart of FIG. 7.

FIG. 7 depicts the request for drive unique information for a status responding data storage drive. FIG. 8 depicts the same process list 410 of FIG. 6, with at least one updated process entry 421.

The task monitor of FIG. 4 will have received the status response from a data storage drive "i" in step 355, and updated the configuration first process state, for example, to "completed" for the status responding data storage drive "i" in step 356, and terminated the first time-out period for the status responding data storage drive "i", and the time-out list is updated.

Step 357 of FIG. 4 leads to step 430 of FIG. 7, which is conducted for the individual status responding data storage drive "i".

The processor, in step 431, transmits a request for drive unique information to the status responding data storage drive "i". In step 433, the configuration process state for the status responding data storage drive "i" is advanced to a second process state, as is depicted by updated entry 421 of FIG. 8. As an example, the updated entry 421 comprises 1) the same identifier of the process as the original entry 411 of FIG. 6 (e.g., since it is the same configuration process); 2) the state of the process (e.g., the state advancing to state 2 of the configuration process for the data storage drive); 3) the current time (for establishing the time for the start of the second time-out period); and 4) the time-out period (e.g., for the second time-out period).

The process returns to the main loop in step 437, completing the event of step 357 of FIG. 4, and the time-out list is updated with the time-out information for the status responding data storage drive "i" of the process list entry 421 of FIG. 8. The process then waits for receipt of the drive unique information from the data storage drive "i".

The process of steps 355–357 of FIG. 4 and steps 430–437 of FIG. 7 are individually repeated for each status responding data storage drive "i".

Thus, the requests for drive unique information are conducted asynchronously, based on the receipt of the status response for that drive, while waiting for other status responses and while waiting for drive unique information of other drives.

Referring to FIG. 4, step 355 represents the receipt of the drive unique information from a data storage drive "i". The content of the drive unique information is as discussed above.

In response to receipt of the drive unique information from a status responding data storage drive within the second time-out period in step 355, the configuration second process state for the information responding data storage drive is updated, for example, to "completed in step 356, and, in step 357, the event is completed by notifying the processor that the drive unique information has been received for drive "i", for example, forwarding the drive unique information and indicating that the process has been "completed" for that drive. Alternatively, the processor has received the drive unique information, and the notification is by the processor that verified information has been received, such that the task monitor may designate the process as "completed" for that data storage drive. The time-out may be allowed to expire without taking any action.

The processor, upon receiving the drive unique information of step 357 of FIG. 4, stores the received drive unique information received from the information responding data storage drive, for example, in memory, such as an NVRAM.

The process of steps 355–357 is conducted individually for each information responding data storage drive "i".

Thus, the receipt of drive unique information is conducted asynchronously, based on the receipt of the drive unique information for that drive, while waiting for other status responses and while waiting for drive unique information of other drives.

As the result, the configuration process is conducted for each of the data storage drives to be configured, and the configuration is separately conducted for each of the data storage drives, and is conducted concurrently for all of the data storage drives to be configured, such that the library processor(s) distribute the library configuration data to each of the drives to be configured and receive the drive unique information for each of the drives, all without undue delay.

Still referring to FIG. 4, step 344 may occur for either the first time-out period or the second time-out period of each data storage drive. Thus, expiration of the first time-out period of step 344 without receipt of the status response for a data storage drive to be configured, or expiration of the second time-out period of step 344 without receipt of the drive unique information for a status responding data storage drive, results in removal of the process for that drive in step 366 and, optionally, posting an error in step 370 and/or starting an error recovery process.

Those of skill in the art understand that the order of the steps of FIGS. 3A–3E, 4, 5 and 6, and the content of the library configuration data, the drive unique information, and the process entries may be varied. Further, the "process list" may be a list, table, array, data structure, etc.

While the preferred embodiments of the present invention have been illustrated in detail, it should be apparent that modifications and adaptations to those embodiments may occur to one skilled in the art without departing from the scope of the present invention as set forth in the following claims.

We claim:

1. A data storage library, comprising:

a plurality of data storage drives; and at least one processor for configuring said data storage drives, said at least one processor:

transmits library configuration data separately to each said data storage drive to be configured, each said data storage drive for acknowledging receipt thereof with a status response;

upon said transmission of said library configuration data to a data storage drive, initiates a configuration first process state for said data storage drive; and starts a first time-out period for receipt of said status response from said data storage drive;

responds to receipt of said status response from a data storage drive to be configured within said first time-out period, updates said configuration first process state for said status responding data storage drive;

transmits a request for drive unique information to said status responding data storage drive;

advances said configuration process to a second state for said status responding data storage drive; and starts a second time-out period for receipt of said drive unique information for said status responding data storage drive;

responds to receipt of said drive unique information from a status responding data storage drive within said second time-out period, updates said configuration second process state for said information responding data storage drive; and stores said received drive unique information received from said information responding data storage drive.

2. The data storage library of claim 1, wherein said at least one processor, additionally:

responds to expiration of said first time-out period without receipt of said status response for a data storage drive to be configured, signaling an error; and responds to expiration of said second time-out period without receipt of said drive unique information for a status responding data storage drive, signaling an error.

3. The data storage library of claim 1, wherein:

said library configuration data comprises at least a communication identifier for said data storage drive; and said drive unique information comprises at least a drive identifier of said data storage drive.

4. A data storage library, comprising:

a plurality of data storage drives; and at least one processor for configuring said data storage drives, said at least one processor comprising a task monitor, said at least one processor:

transmits library configuration data separately to each said data storage drive to be configured, each said data storage drive for acknowledging receipt thereof with a status response;

upon said transmitting of said library configuration data to a data storage drive, assigns, in said task monitor, a configuration first process state for said data storage drive to a process list of said task monitor; and said task monitor starts a first time-out period for completion of receipt of said status response from said data storage drive of said process list;

said task monitor responds to receipt of said status response from a data storage drive to be configured within said first time-out period, updating said configuration first process state for said status responding data storage drive to "completed", removing said configuration first process state for said status responding data storage drive from said process list;

responds to said "completed" state, transmitting a request for drive unique information to said status responding data storage drive;

upon said transmitting of said request for drive unique information to said status responding data storage drive, assigns, in said task monitor, a configuration second process state for said status responding data storage drive to said process list; and said task monitor starts a second time-out period for receipt of said drive unique information for said status responding data storage drive of said process list;

said task monitor responds to receipt of said drive unique information from a status responding data storage drive within said second time-out period, updating said configuration second process state for said information responding data storage drive to "completed", removing said configuration second process state for said information responding data storage drive from said process list; and responds to said "completed" state, storing said received drive unique information received from said information responding data storage drive.

5. The data storage library of claim 4, wherein:

said configuration first process state comprises a process identifier; and said configuration second process state comprises said process identifier.

6. The data storage library of claim 4, wherein said at least one processor, additionally:

said task monitor responds to expiration of said first time-out period without receipt of said status response for a data storage drive to be configured, signaling an error, and removing said process from said process list; and responds to expiration of said second time-out period without receipt of said drive unique information for a status responding data storage drive, signaling an error, and removing said process from said process list.

7. The data storage library of claim 5, wherein:

said configuration first process state additionally comprises a separate index identifier for each said data storage drive assigned said configuration first process state in said process list of said task monitor; and said configuration second process state additionally comprises a separate index identifier for each said status responding data storage drive assigned said configuration second process state in said process list of said task monitor.

8. In a data storage library having at least one processor and a plurality of data storage drives, a method for configuring said data storage drives, comprising the steps of:

transmitting, from said at least one processor, library configuration data separately to each said data storage drive to be configured, each said data storage drive for acknowledging receipt thereof with a status response;

upon said transmitting of said library configuration data to a data storage drive, initiating a configuration first process state for said data storage drive; and starting a first time-out period for receipt of said status response from said data storage drive;

responding to receipt of said status response from a data storage drive to be configured within said first time-out period, updating said configuration first process state for said status responding data storage drive;

transmitting a request for drive unique information to said status responding data storage drive;

advancing said configuration process to a second state for said status responding data storage drive; and starting a second time-out period for receipt of said drive unique information for said status responding data storage drive;

responding to receipt of said drive unique information from a status responding data storage drive within said second time-out period, updating said configuration second process state for said information responding data storage drive; and storing said received drive unique information received from said information responding data storage drive.

9. The method of claim 8, additionally comprising the steps of:

responding to expiration of said first time-out period without receipt of said status response for a data storage drive to be configured, signaling an error; and responding to expiration of said second time-out period without receipt of said drive unique information for a status responding data storage drive, signaling an error.

10. The method of claim 8, wherein:

said library configuration data comprises at least a communication identifier for said data storage drive; and said drive unique information comprises at least a drive identifier of said data storage drive.

11. In a data storage library having at least one processor and a plurality of data storage drives, a method for configuring said data storage drives, comprising the steps of:

transmitting, from said at least one processor, library configuration data separately to each said data storage drive to be configured, each said data storage drive for acknowledging receipt thereof with a status response;

upon said transmitting of said library configuration data to a data storage drive, assigning, in a task monitor, a configuration first process state for said data storage drive to a process list of said task monitor; and said task monitor starting a first time-out period for completion of receipt of said status response from said data storage drive of said process list;

said task monitor responding to receipt of said status response from a data storage drive to be configured within said first time-out period, updating said configuration first process state for said status responding data storage drive to "completed", removing said configuration first process state for said status responding data storage drive from said process list;

responding to said "completed" state, transmitting a request for drive unique information to said status responding data storage drive;

upon said transmitting of said request for drive unique information to said status responding data storage drive,
assigning, in said task monitor, a configuration second process state for said status responding data storage drive to said process list; and
said task monitor starting a second time-out period for receipt of said drive unique information for said status responding data storage drive of said process list;
said task monitor responding to receipt of said drive unique information from a status responding data storage drive within said second time-out period,
updating said configuration second process state for said information responding data storage drive to "completed", removing said configuration second process state for said information responding data storage drive from said process list; and
responding to said "completed" state, storing said received drive unique information received from said information responding data storage drive.

12. The method of claim 11, wherein:
said configuration first process state comprises a process identifier; and
said configuration second process state comprises said process identifier.

13. The method of claim 11, additionally comprising the steps of:
said task monitor, responding to expiration of said first time-out period without receipt of said status response for a data storage drive to be configured, signaling an error, and removing said process from said process list; and
responding to expiration of said second time-out period without receipt of said drive unique information for a status responding data storage drive, signaling an error, and removing said process from said process list.

14. The method of claim 12, wherein:
said configuration first process state additionally comprises a separate index identifier for each said data storage drive assigned said configuration first process state in said process list of said task monitor; and
said configuration second process state additionally comprises a separate index identifier for each said status responding data storage drive assigned said configuration second process state in said process list of said task monitor.

15. A computer program product of a computer readable medium usable with a programmable computer, said computer program product having computer readable program code embodied therein for configuring a plurality of data storage drives of a data storage library, comprising:
computer readable program code which causes a computer processor of said data storage library to transmit library configuration data separately to each said data storage drive to be configured, each said data storage drive for acknowledging receipt thereof with a status response;
computer readable program code which causes a computer processor of said data storage library to, upon transmitting said library configuration data to a data storage drive,
initiate a configuration first process state for said data storage drive; and
start a first time-out period for receipt of said status response from said data storage drive;
computer readable program code which causes a computer processor of said data storage library to respond to receipt of said status response from a data storage drive to be configured within said first time-out period,
by updating said configuration first process state for said status responding data storage drive;
by transmitting a request for drive unique information to said status responding data storage drive;
by advancing said configuration process to a second state for said status responding data storage drive; and
by starting a second time-out period for receipt of said drive unique information for said status responding data storage drive;
computer readable program code which causes a computer processor of said data storage library to respond to receipt of said drive unique information from a status responding data storage drive within said second time-out period,
by updating said configuration second process state for said information responding data storage drive; and
computer readable program code which causes a computer processor of said data storage library to store said received drive unique information received from said information responding data storage drive.

16. The computer program product of claim 15, additionally comprising computer readable program code which causes a computer processor of said data storage library to:
respond to expiration of said first time-out period without receipt of said status response for a data storage drive to be configured, by signaling an error; and
respond to expiration of said second time-out period without receipt of said drive unique information for a status responding data storage drive, by signaling an error.

17. The computer program product of claim 15, wherein:
said library configuration data comprises at least a communication identifier for said data storage drive; and
said drive unique information comprises at least a drive identifier of said data storage drive.

18. A computer program product of a computer readable medium usable with a programmable computer, said computer program product having computer readable program code embodied therein for configuring a plurality of data storage drives of a data storage library, comprising:
computer readable program code which causes a computer processor of said data storage library to transmit library configuration data separately to each said data storage drive to be configured, each said data storage drive for acknowledging receipt thereof with a status response;
computer readable program code which causes a computer processor of said data storage library to, upon transmitting said library configuration data to a data storage drive,
assign, in a task monitor of said computer processor, a configuration first process state for said data storage drive to a process list of said task monitor, said task monitor starting a first time-out period for completion of receipt of said status response from said data storage drive of said process list; and
said task monitor responding to receipt of said status response from a data storage drive to be configured within said first time-out period, updating said configuration first process state for said status responding data storage drive to "completed", removing said configuration first process state for said status responding data storage drive from said process list;

computer readable program code which causes a computer processor of said data storage library to respond to said "completed" state, by transmitting a request for drive unique information to said status responding data storage drive;

computer readable program code which causes a computer processor of said data storage library to, upon transmitting said request for drive unique information to said status responding data storage drive, assign, in said task monitor, a configuration second process state for said status responding data storage drive to said process list, said task monitor starting a second time-out period for receipt of said drive unique information for said status responding data storage drive of said process list;

said task monitor responding to receipt of said drive unique information from a status responding data storage drive within said second time-out period, updating said configuration second process state for said information responding data storage drive to "completed", removing said configuration second process state for said information responding data storage drive from said process list; and computer readable program code which causes a computer processor of said data storage library to respond to said "completed" state, by storing said received drive unique information received from said information responding data storage drive.

19. The computer program product claim 18, wherein:

said configuration first process state comprises a process identifier; and said configuration second process state comprises said process identifier.

20. The computer program product of claim 18, wherein:

said configuration first process state additionally comprises a separate index identifier for each said data storage drive assigned said configuration first process state in said process list of said task monitor; and said configuration second process state additionally comprises a separate index identifier for each said status responding data storage drive assigned said configuration second process state in said process list of said task monitor.

\* \* \* \* \*